United States Patent
Desai et al.

(10) Patent No.: US 8,718,272 B2
(45) Date of Patent: May 6, 2014

(54) CONTACT CENTER ROUTING

(75) Inventors: Prashant B. Desai, Land O Lakes, FL (US); Juan Vasquez, Gibsonton, FL (US); Chadd Thompson, Powell, OH (US); George Gorney, Dallas, TX (US); Mayuresh Hegde, Irving, TX (US); Parind S. Poi, Lewisville, TX (US); Haridas Bhogade, Plant City, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 139 days.

(21) Appl. No.: 13/037,688

(22) Filed: Mar. 1, 2011

(65) Prior Publication Data

US 2012/0224681 A1  Sep. 6, 2012

(51) Int. Cl.
*H04M 3/00* (2006.01)
*H04M 5/00* (2006.01)

(52) U.S. Cl.
USPC ............ 379/266.1; 379/265.11; 379/265.12; 379/265.13

(58) Field of Classification Search
CPC ............ H04M 3/523; H04M 3/52333; H04M 3/5235; H04M 2203/40; H04M 2203/402; H04M 2203/401
USPC ............ 379/265.01, 265.02, 265.11, 266.01
See application file for complete search history.

(56) References Cited

U.S. PATENT DOCUMENTS

| | | | |
|---|---|---|---|
| 5,537,470 A * | 7/1996 | Lee | 379/265.11 |
| 5,627,884 A | 5/1997 | Williams et al. | |
| 5,703,943 A * | 12/1997 | Otto | 379/265.11 |
| 6,563,921 B1 | 5/2003 | Williams et al. | |
| 6,754,334 B2 | 6/2004 | Williams et al. | |
| 6,801,619 B1 * | 10/2004 | Bae | 379/266.01 |
| 6,813,349 B2 * | 11/2004 | Johnson et al. | 379/265.02 |
| 6,826,194 B1 * | 11/2004 | Vered et al. | 370/449 |
| 6,850,615 B1 * | 2/2005 | Patel et al. | 379/266.06 |
| 6,870,924 B1 * | 3/2005 | Ukon | 379/265.02 |
| 7,564,962 B1 * | 7/2009 | O'Keeffe et al. | 379/265.09 |
| 7,746,999 B2 | 6/2010 | Williams et al. | |
| 7,787,610 B1 | 8/2010 | Williams et al. | |
| 8,112,069 B2 | 2/2012 | Williams et al. | |
| 8,150,023 B2 | 4/2012 | Williams et al. | |
| 8,213,911 B2 | 7/2012 | Williams et al. | |
| 8,254,555 B1 * | 8/2012 | Noble, Jr. | 379/265.01 |
| 2002/0196928 A1 * | 12/2002 | Johnson et al. | 379/266.01 |
| 2003/0185382 A1 * | 10/2003 | Zama | 379/265.13 |
| 2007/0201684 A1 * | 8/2007 | Boghani | 379/360 |
| 2008/0037764 A1 * | 2/2008 | Lee et al. | 379/266.01 |
| 2010/0080378 A1 * | 4/2010 | Katz | 379/265.14 |
| 2012/0183131 A1 * | 7/2012 | Kohler et al. | 379/265.12 |

FOREIGN PATENT DOCUMENTS

GB  2329551 B  * 10/2002

* cited by examiner

*Primary Examiner* — Sonia Gay (57) ABSTRACT

A method may include receiving a call from a caller and determining whether the caller has previously called a call center. The method may also include identifying, in response to determining that the caller has previously called the call center, an agent that handled the previous call from the caller, and forwarding the call to the agent that handled the previous call.

19 Claims, 8 Drawing Sheets

CONTACT CENTER ROUTING

BACKGROUND INFORMATION

Companies often use call centers to address customer inquiries, take customer orders and/or resolve customer problems. Interactive voice response (IVR) systems are frequently used to initially interact with the caller to obtain information regarding the call. The call is then often transferred to a human agent to service the customer inquiry and provide the desired assistance.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to forwarding a communication received at a call/contact center to an agent that has previously interacted with the customer. In one implementation, a routing/decision engine at a call center determines whether the customer contacting the call center has previously contacted the call center within a predetermined period of time. If the customer has previously contacted the call center within the predetermined period of time, the communication (e.g., telephone call) may be forwarded to the same agent that handled the previous interaction/call. In some implementations, the routing or decision engine at the call center may determine whether the particular agent has the skill set to handle the current call/communication and/or whether the agent has an internal quality rating that is above a threshold level before determining whether to allow the previous agent to handle the current call/communication. In addition, in some instances, the routing/decision engine may also inquire whether the customer would like to have the communication handled by the agent with whom he/she previously interacted prior to routing the communication to the previous agent.

Figure 1:
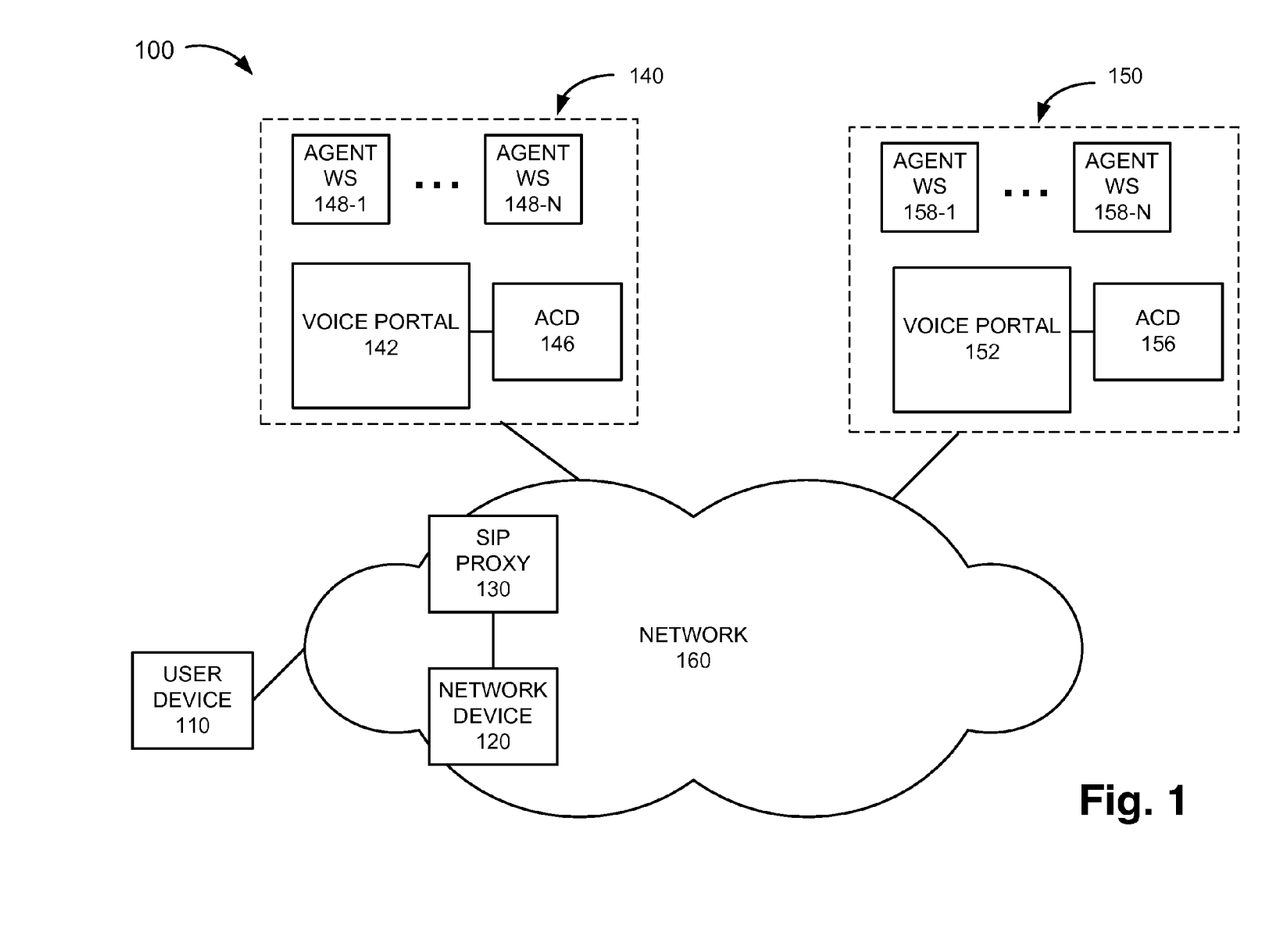
FIG. 1 illustrates an exemplary network in which systems and methods described herein may be implemented.

FIG. 1 is a block diagram of an exemplary network 100 in which systems and methods described herein may be implemented. Referring to FIG. 1, network 100 includes user device 110, network device 120, session initiation protocol (SIP) proxy 130, call centers 140 and 150 and network 160.

User device 110 may include any type of communication or computation device that is capable of transmitting and receiving voice signals and/or data to/from a network, such as network 160. For example, user device 110 may include any standard telephone, cordless telephone, cellular telephone, or other type of conventional telephone that interfaces with a public switched telephone network (PSTN) and/or wireless network to place and receive telephone calls. User device 110 may also include any client, such as a computer device, a web-based appliance, etc., that is configured to provide telephone functions using, for example, voice over Internet protocol (VoIP), H.323 protocol, etc. For example, user device 110 may include a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional personal computer (PC), laptop computer or other computing device.

User device 110 may further include any type of communication or computation device, such as a PC, laptop computer, tablet computer, personal digital assistant, cell phone, etc., that is capable of transmitting data (e.g., emails, text messages, instant messages, facsimiles, etc.), video data (e.g., video calls, video chats, video messages, etc.) and/or voice data (e.g., voice calls) to/from a network, such as network 160.

Network device 120 may include one or more devices that allow divergent transport networks to communicate and cooperatively carry traffic. For example, network device 120 may include a gateway that provides for interoperation at two levels, e.g., between different signaling schemes and between different media forms. As an example, network device 120 may adapt between SS7 signaling of network 160 and session initiation protocol (SIP), H.323 protocols or other protocols (e.g., Internet protocols (IPs) or Internet based protocols) used by other devices in network 100. In one implementation, network device 120 may convert time division multiplexed (TDM) encoded voice signals to a packetized data stream suitable for transport to and processing by a proxy device, such as SIP proxy 130.

Network device 120 may also include one or more session border controllers (SBCs) that provide control of the boundary between different service provider networks, provide signaling protocol inter-working between an IP-based network and other service provider networks, control the transport boundary between service provider networks, and provide usage metering and Quality of Service (QoS) measurements for media flows. In one implementation, network device 120 may correspond to an ingress point to SIP proxy 130. For example, network device 120 may receive a VoIP call from user device 110 and forward the VoIP call to SIP proxy 130.

SIP proxy 130 may include a server/computing device that is able to receive data from network device 120 and forward the received data to an appropriate voice portal, such as voice portal 142 or 152 (described below) using SIP protocol. In other implementations, SIP proxy 130 may be able to receive and forward data via another protocol, such as H.323.

Call center 140 may represent a call center configured to receive and handle a large volume of calls. Call center 140 may include voice portal 142, automatic call distributor (ACD) 146 and agent workstations (WSs) 148-1 through 148-N (referred to collectively as agent WSs 148 or individually as agent WS 148). Voice portal 142 may represent a front end device associated with call center 140. In an exemplary implementation, voice portal 142 may include interactive voice response (IVR) unit that interacts with callers to obtain information associated with the call, as described in detail below.

ACD 146 may distribute calls received at voice portal 142 to one of agent WSs 148-1 through 148-N. ACD 146 is illustrated as being a separate component that is located externally from voice portal 142. In some implementations, ACD 146 may be part of voice portal 142 (e.g., a sub-component of voice portal 142). In each case, ACD 146 may forward calls to an available one of the agent WSs 148.

Agent WSs 148 may represent a workstation/computer and operator used to handle calls from callers that require human intervention. In an exemplary implementation, agent WSs 148 may be associated with voice portal 142 and ACD 146. In addition, in an exemplary implementation, agent WSs 148 may be connected to ACD 146 and/or voice portal 142 via a network, such as network 160. In alternative implementations, agent WSs 148 may be connected directly to ACD 146 and/or voice portal 142, connected via a LAN, connected via a private network, etc.

Agent WSs 148 may include a workstation or computer, such as a personal computer or laptop. Agent WSs 148 may also include any device capable of performing IP based messaging, such as VoIP, to transmit voice, video and/or text. Agent WSs 148 may also include any telephone device (not shown) to place and receive telephone calls. For example, the telephone device may be a standard telephone, a cordless telephone, a cellular telephone or any other type of telephone. The telephone device may also include any type of device that is capable of transmitting and receiving voice signals to/from a data network. For example, the telephone device may include any client, such as a computer device, a web-based appliance, etc., that is configured to provide telephone functions. The telephone device may, for example, be a SIP-based telephone device. In this case, the SIP-based telephone device may take the form of a standalone device, e.g., a SIP telephone designed and configured to function and appear like a conventional telephone. A SIP-based telephone device may also include a software client that may run, for example, on a conventional PC, laptop computer or other computing device. In some implementations, agent WSs 148 may include speech recognition hardware/software that receives voice responses from a caller and identifies what the caller has voiced.

Call center 150 may represent another call center designed to receive and handle calls. For example, call center 140 and call center 150 may be associated with the same business entity, but may be designated for handling different types of calls/inquiries. As an example, call center 140 may be designated for handling customer orders and call center 150 may be designated for resolving customer problems. Referring to FIG. 1, call center 150 may include voice portal 152, ACD 156 and agent workstations (WSs) 158-1 through 158-N (referred to collectively as agent WSs 158 or individually as agent WS 158). Voice portal 152, ACD 156 and agent WSs 158 may be configured to operate in a similar manner as voice portal 142, ACD 146 and agent WSs 148, as described above with respect to call center 140.

Network 160 may include one or more wired, wireless and/or optical networks that are capable of receiving and transmitting data and voice signals. For example, network 160 may include one or more public switched telephone networks (PSTNs) or other type of switched network. Network 160 may also include one or more wireless networks and may include a number of transmission towers for receiving wireless signals and forwarding the wireless signals toward the intended destination. Network 160 may further include one or more satellite networks, one or more packet switched networks, such as an Internet protocol (IP) based network, a local area network (LAN), a wide area network (WAN), an intranet, the Internet, or another type of network that is capable of transmitting telecommunications traffic (e.g., voice, video and/or data traffic). For example, network 160 may include one or more SIP-based networks, one or more H.323/H.225-based networks, or any other type of packet switched network that is capable of transmitting traffic from a source device to a destination device.

The exemplary configuration illustrated in FIG. 1 is provided for simplicity. It should be understood that a typical network may include more or fewer devices than illustrated in FIG. 1. For example, one user device 110, one network device 120, one SIP proxy 130, two call centers 140 and 150 and one network 160 are shown for simplicity. It should be understood that network 100 may include a large number (e.g., hundreds or thousands) of user devices, work stations, a number of other networks and/or voice portals. As an example, in one implementation, each of call centers 140 and 150 may include hundreds of agent WSs and multiple ACDs. Further, additional and/or different switching devices, routing devices, etc., involved in routing communications and data between user devices, such as user device 110, and call centers 140 and 150 may be included in network 100.

Further, various functions are described as being performed by particular components in network 100. In other implementations, various functions described as being performed by one device may be performed by another device or various functions described as being performed by multiple devices may be combined and performed by a single device.

Figure 2:
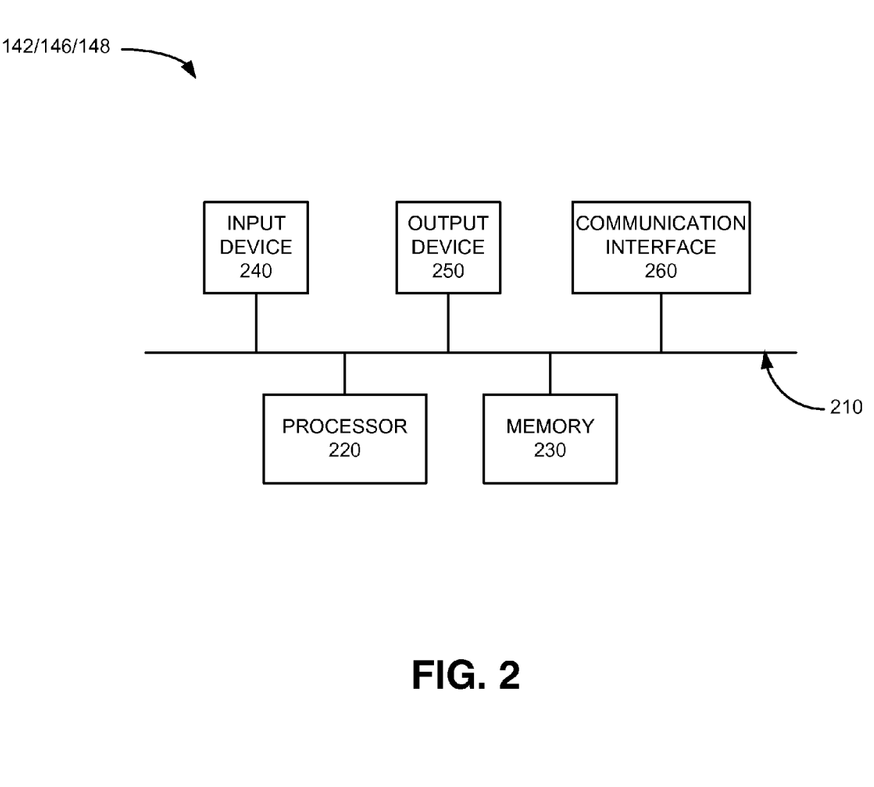
FIG. 2 illustrates an exemplary configuration of one or more of the components of FIG. 1.

FIG. 2 illustrates an exemplary configuration of voice portal 142. Other devices in network 100, such as voice portal 152, ACDs 146 and 156 and agent WSs 148/158 may be configured in a similar manner. Referring to FIG. 2, voice portal 142 may include bus 210, processor 220, memory 230, input device 240, output device 250 and communication interface 260. Bus 210 may include a path that permits communication among the elements of voice portal 142.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information to voice portal 142, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD), a printer, a speaker, etc.).

Communication interface 260 may include a transceiver that voice portal 142 may use to communicate with other devices (e.g., user device 110, network device 120, SIP proxy 130, ACD 146, agent WSs 148, etc.) via wired, wireless or optical mechanisms. Communication interface 260 may also include one or more radio frequency (RF) transmitters, receivers and/or transceivers and one or more antennas for transmitting and receiving RF data via network 160. Communication interface 260 may also include a modem or an Ethernet interface to a LAN or other mechanisms for communicating with elements in a network, such as network 160 or another network.

The exemplary configuration illustrated in FIG. 2 is provided for simplicity. It should be understood that voice portal 142 (or voice portal 152, ACDs 146 and 156, agent WSs 148 and 158, etc.) may include more or fewer devices than illustrated in FIG. 2. In an exemplary implementation, voice portal 142 (or voice portal 152, ACDs 146 and 156, agent WSs 148 or 158) may perform operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
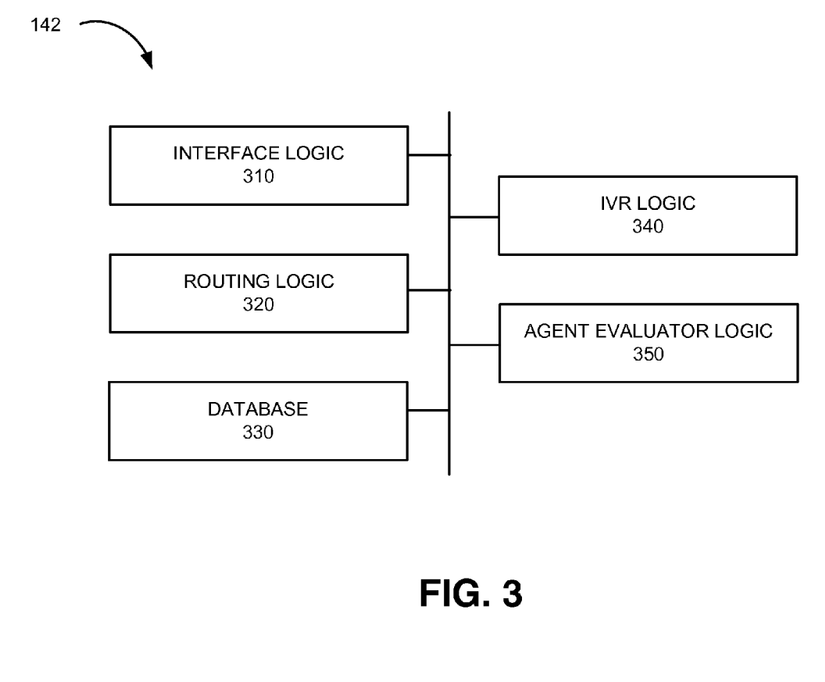
FIG. 3 illustrates an exemplary configuration of logic components implemented in one or more of the components of FIG. 1.

FIG. 3 is a functional block diagram of voice portal 142 according to an exemplary implementation. The logical blocks illustrated in FIG. 3 may be implemented in software, hardware, or a combination of hardware and software. For example, some or all of the logical blocks illustrated in FIG. 3 may be implemented by processor 220 executing instructions stored in memory 230. In one implementation, the logical blocks illustrated in FIG. 3 are implemented inside of call center 140. It should be understood that the logical blocks illustrated in FIG. 3 may be located externally with respect to call center 140 in other implementations, such as within a network device accessible via network 160.

Referring to FIG. 3, voice portal 142 may include interface logic 310, routing logic 320, database 330, interactive voice response (IVR) logic 340 and agent evaluator logic 350. Interface logic 310 may include a front end that receives calls from callers (e.g., via user device 110). Interface logic 310 may determine the telephone number associated with an incoming call. For example, interface logic 310 may include an automatic number identification (ANI) system that determines the telephone number associated with an incoming call. In some implementations, interface logic 310 may also include logic to identify an address, such as an IP address, associated with an incoming call made from a computer device.

Routing logic 320 (also referred to herein as decision logic 320) may use the caller's telephone number to determine the caller's name and/or other information associated with the caller. For example, routing logic 320 may access a database (e.g., database 330) of caller telephone numbers and corresponding names. Alternatively, the database of telephone numbers and corresponding names may be stored on a device located externally from voice portal 142.

Routing logic 320 may also access database 330 to retrieve information associated with the particular caller. For example, routing logic 320 may use the caller's telephone number and/or name as an index to database 330 to determine whether the caller is a repeat caller, such as a caller who has called within a predetermined period of time (e.g., one day, three days, seven days, etc.). If the caller is a repeat caller, routing logic 320 may determine whether the caller would like to talk to the agent with whom he/she interacted with on the previous call.

For example, routing logic 320 may access database 330 to identify an agent with whom the caller interacted on the most recent call. IVR logic 340 may then audibly provide this information to the caller to inquire whether the caller would like to interact with the same agent on the current call, as described in more detail below.

Database 330, as described above, may store information associated with callers. For example, database 330 may store customer telephone numbers and corresponding names and addresses associated with the customers. Database 330 may further include information regarding an agent with whom the caller interacted on a previous call. This information may be used by voice portal 142 when forwarding a call to an agent WS 148.

Figure 4:
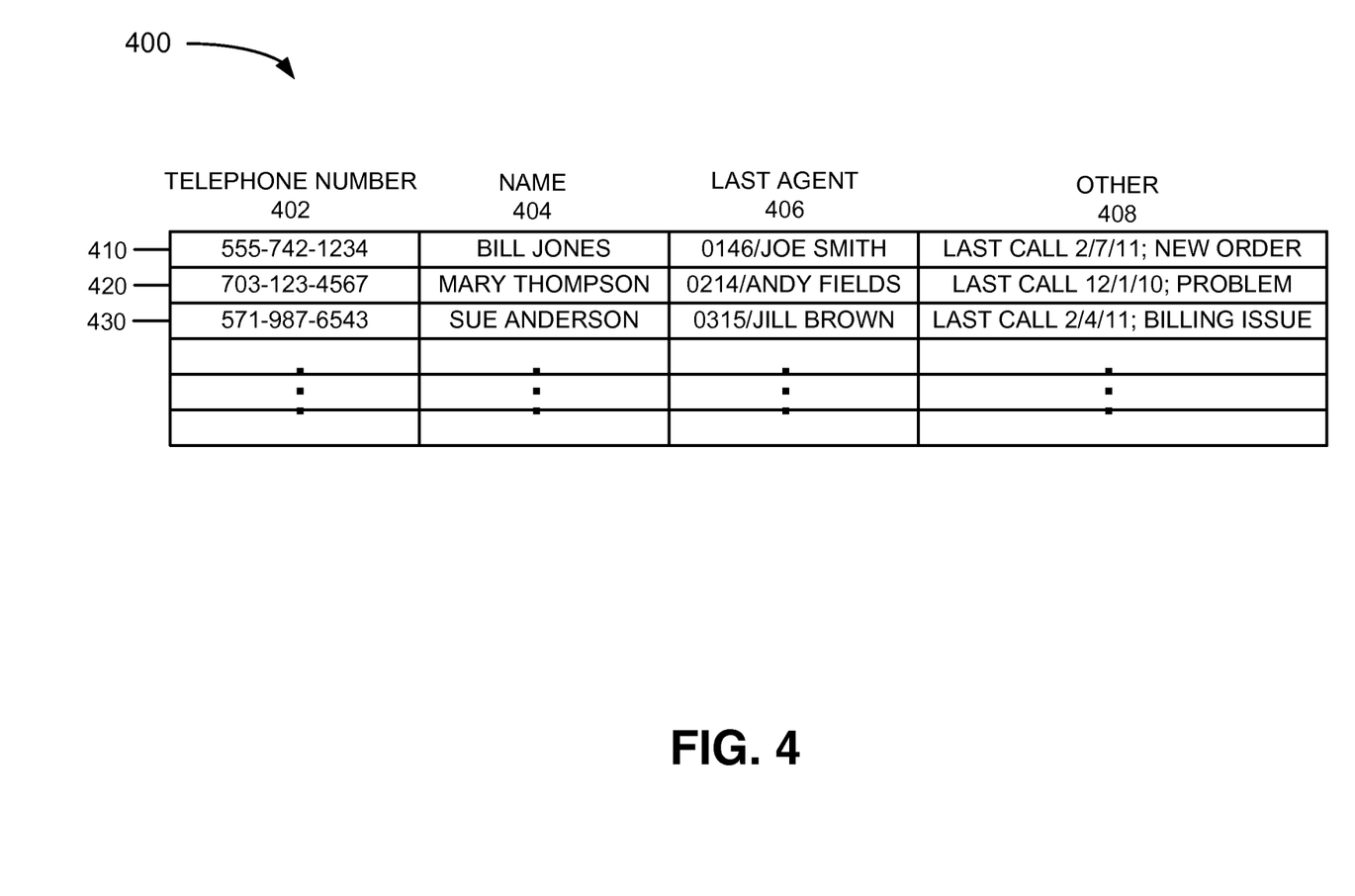
FIGS. 4 and 5 illustrate exemplary tables used by one or more of the logic components illustrated in FIG. 3.

As an example, FIG. 4 illustrates an exemplary table 400 stored in, for example, database 330. Referring to FIG. 4, table 400 may include telephone number field 402, name field 404, last agent field 406 and other field 408. Telephone number field 402 may store telephone numbers associated with customers. Name field 404 may store a name of the customer associated with the telephone number in field 404. Last agent field 406 may include an agent identifier and/or an agent name associated with the agent who handled the most recent previous call associated with the customer identified in field 404. Other field 408 may store additional information associated with the call, such as the date of the last call from the caller associated with the telephone number in field 402 (or the number of days from the previous call), the nature or reason associated with the previous call, etc. For example, entry 410 in table 400 indicates that the telephone number 555-742-1234 is associated with customer Bill Jones, that the last agent handling a call from Bill Jones was Agent 0146, which corresponds to agent Joe Smith, and that the last call was received on Feb. 7, 2011 and involved a new order. The information stored in table 400 may be used to identify an appropriate agent to handle a call, as described in more detail below.

IVR logic 340 may include logic to interact with callers to obtain information associated with the call. For example, IVR logic 340 may include speech software/hardware that provides voice commands to a caller to obtain information. IVR logic 340 may also include speech recognition hardware/software that receives voice responses from the caller and identifies what the caller has voiced. For example, IVR logic 340 may interact with the caller to identify the reason for the call or the nature of the call. IVR logic 340 may also query the caller to determine whether the caller would like to have the agent with whom the caller previously interacted handle the current call. Voice portal 142 may use this information to forward the call to an appropriate agent WS, such as one of agent WSs 148, or to ACD 146 that distributes calls among agent WSs 148.

Referring back to FIG. 3, agent evaluator logic 350 may include logic associated with determining and/or updating agent ratings and/or a skill set associated with various agents. For example, each agent may be provided a numerical or other type of quality rating based on a number of factors associated with the agent. The agent rating may be updated continuously/periodically by agent evaluator logic 350 or by personnel or other systems in network 100. In each case, the agent-related information may be stored for use in determining whether a call should be routed to a particular agent.

Figure 5:
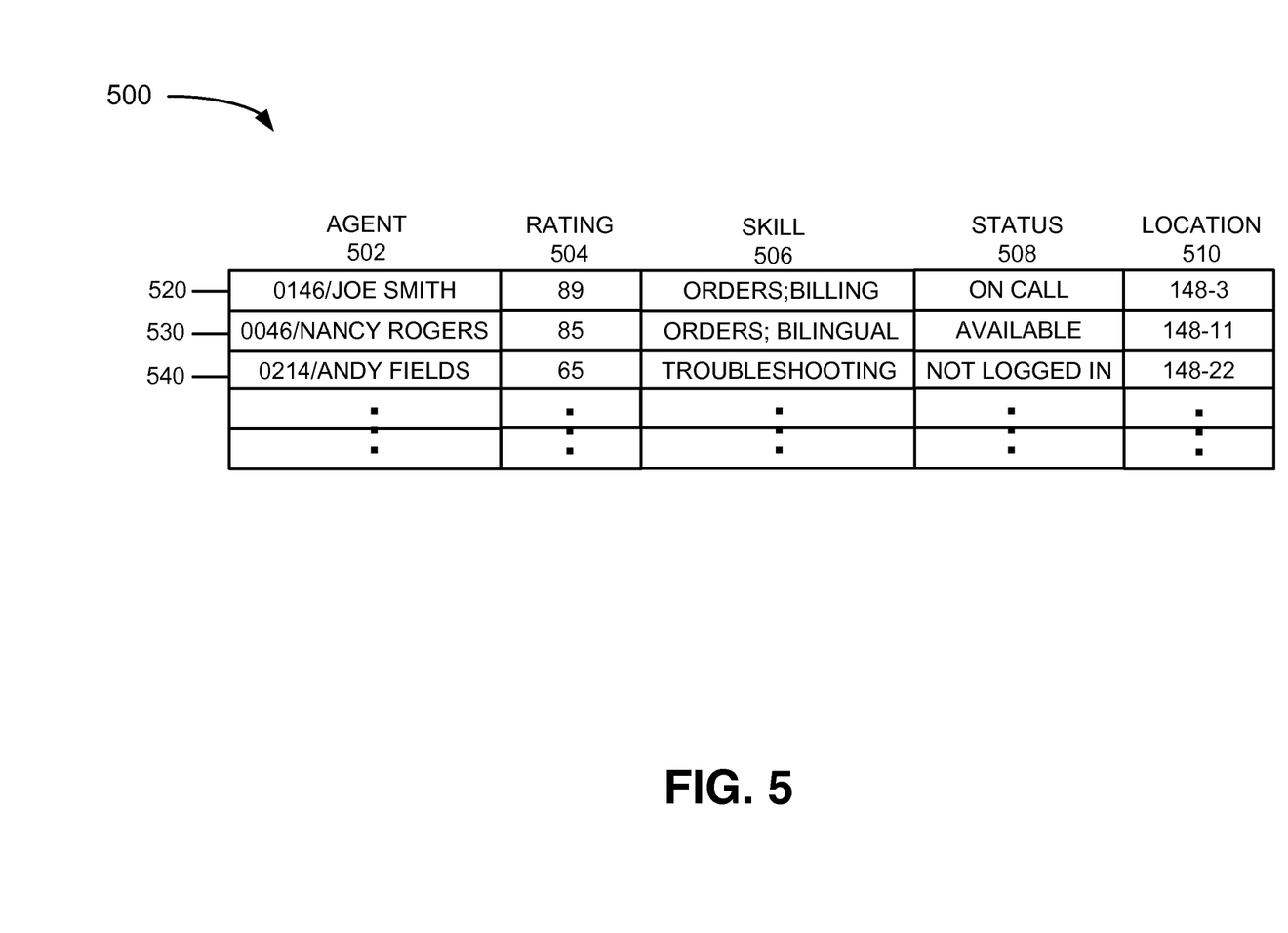

As an example, FIG. 5 illustrates an exemplary table 500 stored in, for example, database 330. Referring to FIG. 5, table 500 may include agent field 502, rating field 504, skill field 506, status field 508 and location field 510. Agent field 502 may store information identifying a name or other identifier associated with agents. Rating field 504 may store a rating associated with the agent identified in agent field 502. For example, entry 520 indicates that agent Joe Smith has an agent rating of 89. This rating may be based on supervisors monitoring calls handled by the agent (i.e., Joe Smith in this example), lack of complaints regarding the agent, the average time taken by the agent on each call, etc.

Skill field 506 may identify particular skills associated with an agent, such as types of calls the agent is able to handle (e.g., orders, billing-related, troubleshooting, etc.), whether the agent speaks more than one language, etc. For example, field 506 of entry 520 indicates that agent Joe Smith can handle order-related issues and billing-related issues.

Status field 508 may store information identifying a current state or status of the agent identified in field 502, such as "on call," "available," "not available/not logged in," etc. Location field 510 may store information identifying a location of the agent, such as an agent workstation location.

Routing logic 320 may use table 500 to determine whether a call from a repeat caller should be forwarded to a particular agent. For example, routing logic 320 may forward a current call to an agent that most recently interacted with the caller, as described in detail below.

Figure 6:
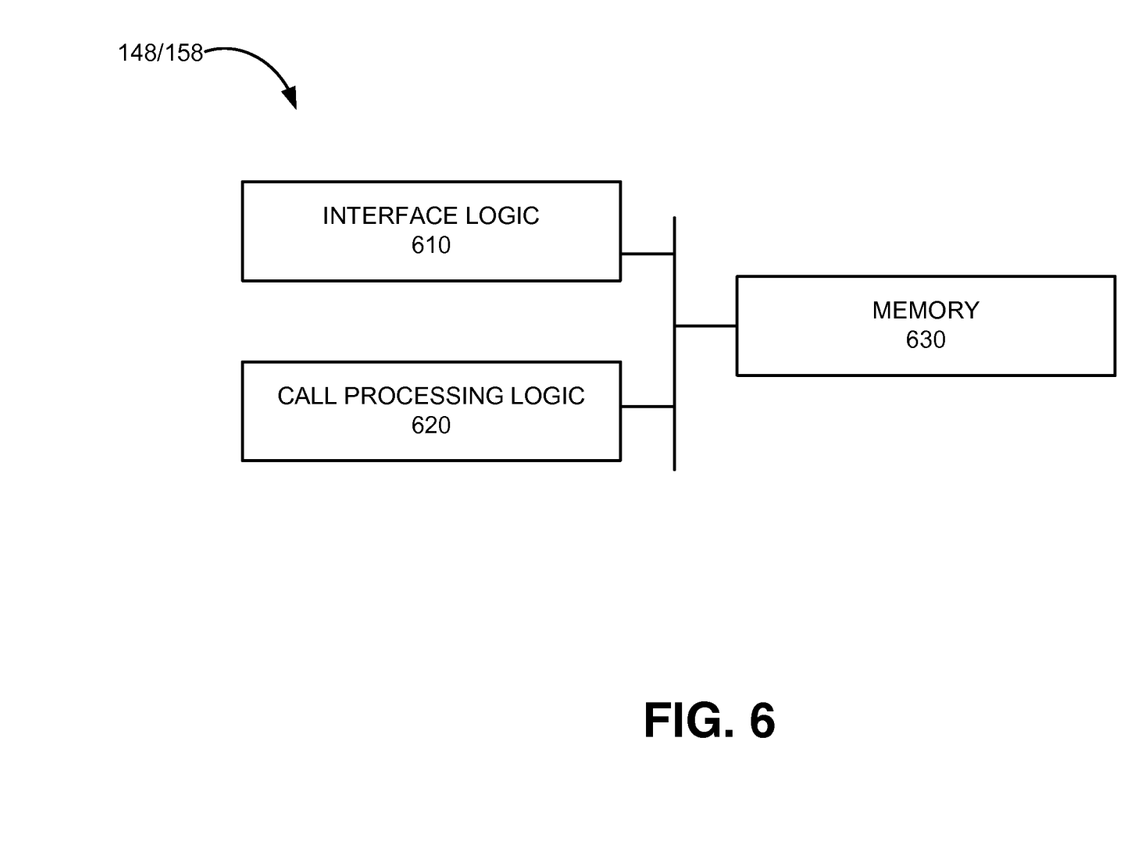
FIG. 6 illustrates an exemplary configuration of logic components implemented in another one or more of the components of FIG. 1.

FIG. 6 is a functional block diagram of agent WS 148 according to an exemplary implementation. Agent WS 158 may be configured in a similar manner. The logical blocks illustrated in FIG. 6 may be implemented in software, hardware, or a combination of hardware and software. For example, some or all of the logical blocks illustrated in FIG. 6 may be implemented by processor 220 executing instructions stored in memory 230. In one implementation, the logical blocks illustrated in FIG. 6 are implemented in agent WS 148. It should be understood that the logical blocks illustrated in FIG. 6 may be located externally from agent WS 148 in other implementations.

Referring to FIG. 6, agent WS 148 may include interface logic 610, call processing logic 620 and memory 630. Interface logic 610 may include a front end that receives calls from callers, such as a caller at user device 110. The calls may be forwarded to agent WS 148 by voice portal 142 or ACD 146. In an exemplary implementation, voice portal 142 and/or ACD 146 may forward various information associated with a call. For example, the telephone number, IP address and/or reason for the call may be provided with the call to interface logic 610 when agent WS 148 receives the call. Interface logic 610 may output this information to the agent via output device 250 (e.g., an LCD screen) of agent WS 148. For example, interface logic 610 may identify information in the forwarded call, such as the name of the caller, the telephone number of the caller, a reason for the call, a call type, etc., and output the information for display to the agent. In some implementations, the identified information may be included in a header, such as a SIP header, of the forwarded call.

In some instances, interface logic 610 may also receive information indicating that the call is from a previous caller. In this case, call processing logic 620 may retrieve detailed transaction information from memory 630 regarding the previous call/interaction. Details regarding the previous interaction, such as the reason for the call, the resolution of the call, etc., may be output via output device 250 for display to the agent. For example, if the caller previously order a new premium cable TV service, call processing logic 620 may retrieve details of the customer's order from memory 630 and output the order-related information to the display of the agent WS 148.

Memory 630, as described above, may store information regarding previous transactions from callers. Memory 630 may also store voice message, video message, text messages, etc., from callers. In some implementations, call processing logic 620 may prompt a caller to leave a message when the agent is unavailable. Processing logic 620 may, in some instances, automatically call back the caller based on a received message. For example, if the agent is unable to handle the call when the caller calls and the caller leaves a message, call processing logic 620 may automatically detect the existence of the message and automatically call back the caller when the agent is able to handle the call and/or at a predetermined time. In each case, agent WS 148 may allow an agent to interact with a caller, such as a previous caller, to expedite the handling of the call.

Figure 7A:
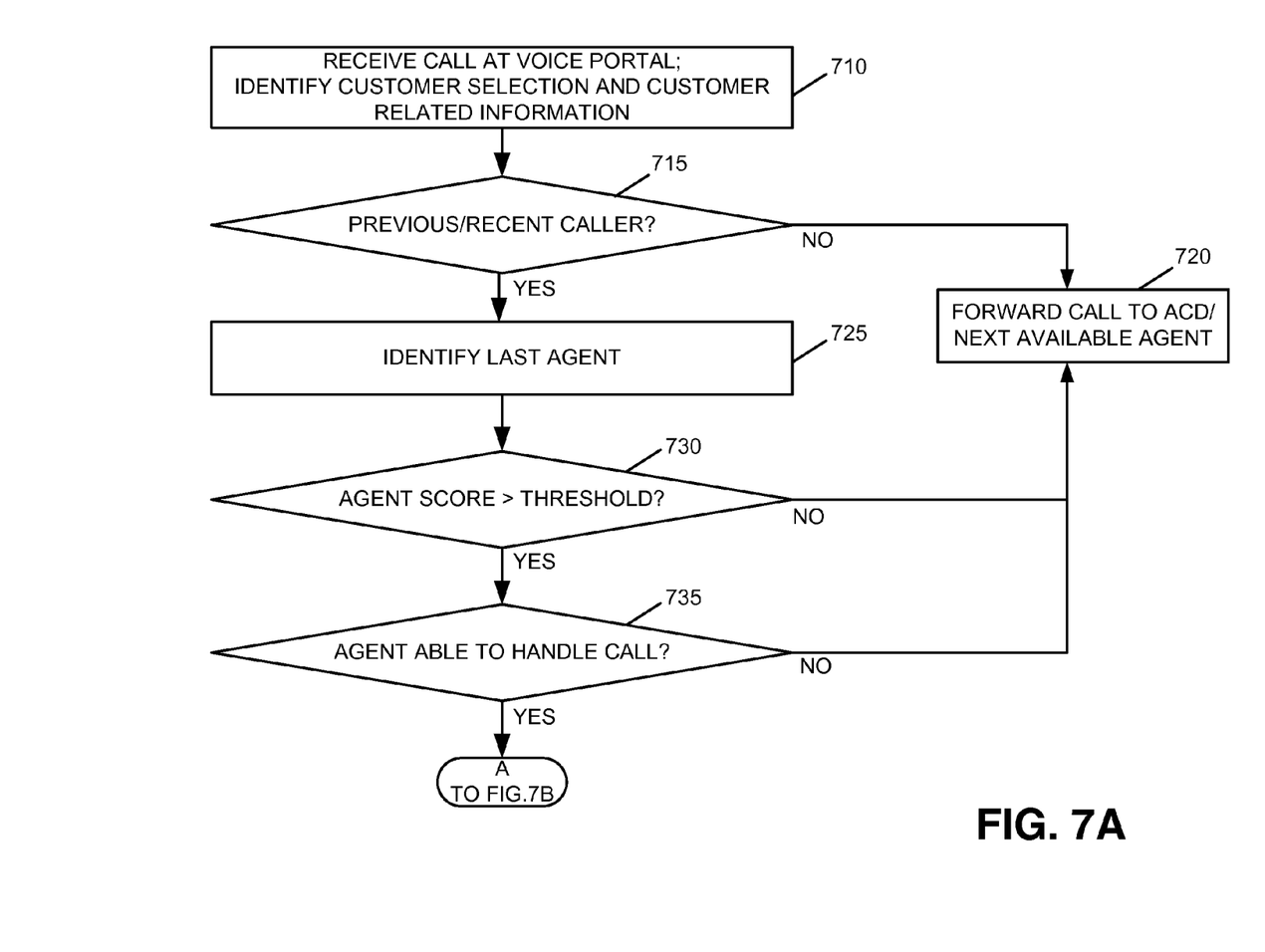
FIGS. 7A and 7B are flow diagrams illustrating exemplary processing associated with the components of FIG. 1.
Figure 7B:
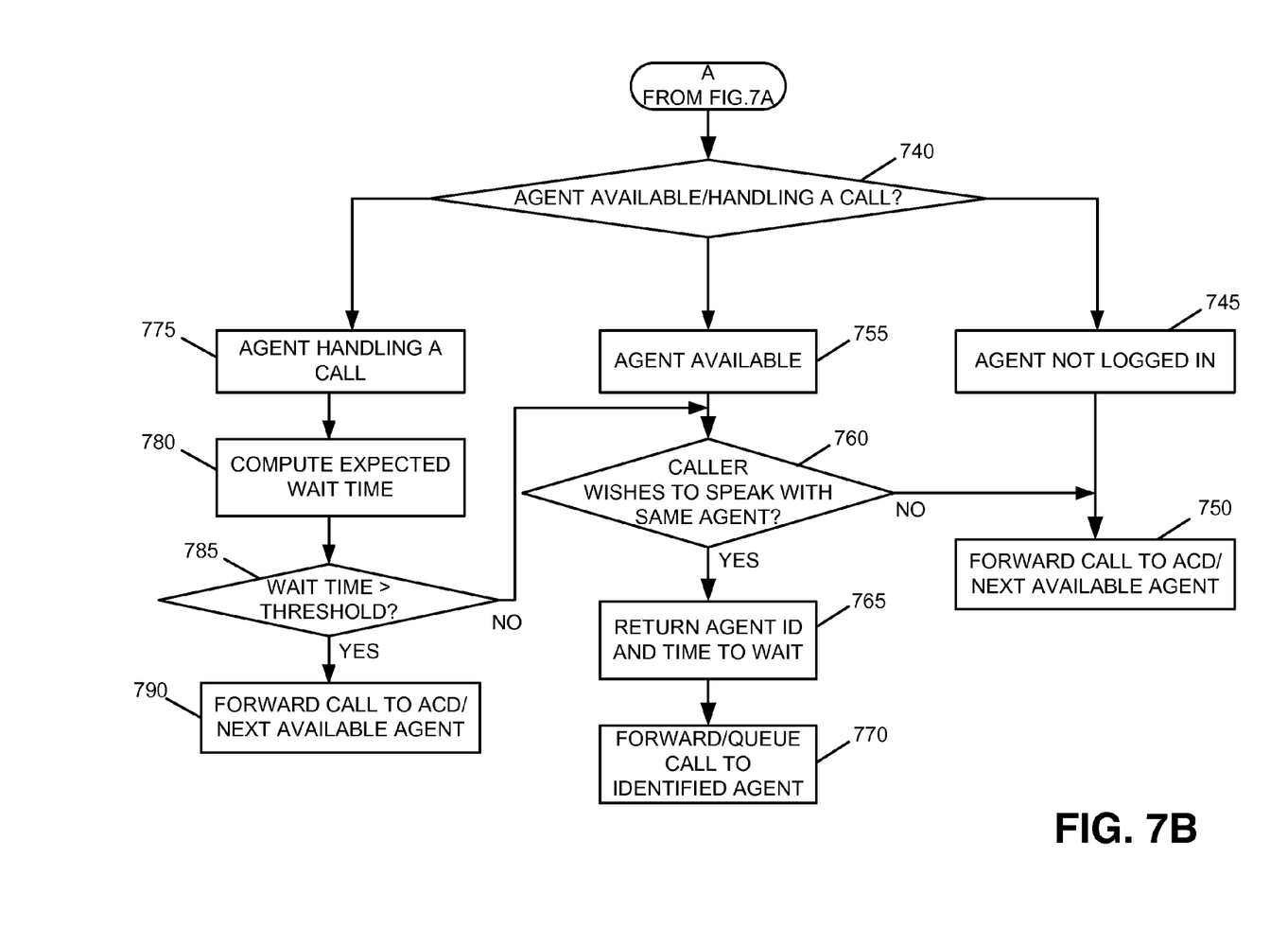

FIGS. 7A and 7B are exemplary flow diagrams illustrating processing associated with components in network 100. Processing may include a caller establishing communications with voice portal 142. For example, a caller (also referred herein as a customer) at user device 110 may call a telephone number associated with voice portal 142 or enter an Internet address associated with voice portal 142. In each case, voice portal 142 may receive the call (act 710).

Voice portal 142 may provide an automated greeting to the caller at user device 110. Voice portal 142 may also provide a menu of options to determine the reason or nature of the call and audibly request that the caller voice or input a selection via a keypad. Voice portal 142 may identify the caller's selection (act 710). For example, IVR logic 340 may identify the caller's voice selection or identify a keypad input. In this example, assume that voice portal 142 is associated with providing services to customers, such as cable television service for the caller at user device 110. Further assume that the caller has input a selection to speak to a customer agent about his/her television service.

Interface logic 310 (FIG. 3), as described above, may perform an ANI lookup to identify the caller's telephone number. Interface logic 310 may also use the telephone number as an index to a database to determine a name and/or address associated with the caller's telephone number, as well as other customer related information (e.g., current services provided to customer, recent orders/purchases, etc.) (act 710).

Voice portal 142 may also determine whether the caller has previously contacted call center 140 within a predetermined period of time, such as within the past three days, seven days, two weeks, etc. (act 715). For example, routing logic 320 may access table 400 and determine whether the caller has called within a predetermined period of time. As an example, assume that the current call was received on Feb. 11, 2011 and that the predetermined period of time is seven days. In this case, routing logic 320 may access field 408 and determine whether the particular caller identified by the telephone number on which the call was received has called within the past seven days (i.e., between Feb. 4, 2011 and Feb. 11, 2011). If the caller has not called within the past seven days (act 715—no), routing logic 320 may forward the call to ACD 146 along with the identified customer information, such as the customer's name, address, telephone number and/or reason for the call (act 720). This customer-related information will be forwarded to a next available one of agent WSs 148, where the agent's screen will display the customer information (e.g., the caller's name and/or address, telephone number, reason for the call, etc.) as a screen pop. That is, the customer-related information may be automatically displayed via output device 250 (e.g., an LCD screen) of agent WS 148 when the call is transferred to agent WS 148.

If, however, the caller has called within the predetermined period of time (act 715—yes), routing logic 320 may identify the agent that handled the previous call (act 725). For example, if the call was received from telephone number 555-742-1234, which corresponds to entry 410 in table 400, routing logic 320 may identify agent Joe Smith was the agent who most recently handled a call for customer Bill Jones.

Routing logic 320 may then determine whether a score or rating for the agent that handled the previous call (i.e., Joe Smith in this example) is greater than a threshold value (act 730). For example, routing logic 320 may access table 500 and identify agent information for the agent that last serviced a call from the customer. Continuing with the example above, routing logic 320 may use agent Joe Smith (or agent identifier 0146) as an index to table 500 and determine that entry 520 corresponds to agent Joe Smith. If agent Joe Smith's rating stored in field 504 is not above the predetermined threshold, routing logic 320 may forward the call to ACD 146, which forwards the call to the next available agent (act 720). The predetermined threshold may be based on various agent rating factors, as described above. In this case, if the agent's rating is less than the threshold, the entity owning/managing call center 140 may not want to forward a repeat call to the same agent since that particular agent may not be one of the more experienced agents. Therefore, routing logic 320 may forward the call to ACD 146 along with information to ensure that the call is not forwarded to the previous agent.

Continuing with this example, assume that the predetermined threshold is 75 and agent Joe Smith's rating is 89, as indicated in field 504 of entry 520 in table 500. Therefore, routing logic 320 determines that the agent's rating is above the threshold (act 730—yes).

After determining that the agent's rating is above the threshold, routing logic 320 may determine whether the agent is able to handle the call based on the agent's skill set (act 735). For example, based on interaction with the caller, IVR logic 340 may determine that the caller wishes to speak to an agent about a billing issue with a recent order. In this case, routing logic 320 may access skill field 506 to determine whether the previous agent has the skill set to handle a customer's billing inquiry. If not (act 735—no), routing logic 320 may forward the call to ACD 146 along with information to ensure that the call does not get forwarded to the previous agent (i.e., Joe Smith in this example).

Continuing with the example above in which agent Joe Smith was the previous agent, routing logic 320 accesses skill field 506 of entry 520 and determines that agent Joe Smith can handle billing issues (act 735—yes). Routing logic 320 may then determine the agent's availability/status (FIG. 7B, act 740).

For example, routing logic 320 may determine whether the agent is currently handling a call, is currently available or is currently not available/not logged in. In exemplary implementation, routing logic 320 may access field 508 of the entry corresponding to the identified agent to determine the availability status of the agent. If routing logic 320 determines that the agent is not logged in (act 745), routing logic 320 may forward the call to ACD 146 for servicing by the next available agent (act 750).

If, however, routing logic 320 determines that the agent is available (act 755), voice portal 142 may determine whether the caller wishes to speak with the agent who handled the previous call (act 760). For example, routing logic 320 may provide information corresponding to the name of the previous agent to IVR logic 340. IVR logic 340 may then provide an audio announcement to the caller, such as: "Mr. Jones, you previously spoke with agent Joe Smith. Would you like to speak with agent Smith again?" If the caller answers affirmatively (act 760—yes), routing logic 320 may return an identifier (ID) associated with the agent and optionally a time to wait value associated with when the call will be forwarded to the agent (act 765). IVR logic 320 may optionally voice the time to wait (e.g., 5 seconds or less) to the caller and forward the call to agent Smith (act 770). In this case, since routing logic 320 previously determined that agent Smith was available, the call may be essentially immediately forwarded to agent Smith using the agent ID and/or location field 510 of entry 520. Continuing with the example in table 500, agent Smith is located at agent WS 148-3. In this case, routing logic 320 may forward the call directly to agent WS 148-3 or forward information to ACD 146 indicating that the current call should be forwarded to agent 0146 (i.e., Joe Smith) located at agent WS 148-3.

Agent WS 148-3 may receive the call and automatically "pop" information to Agent Smith's output device 250 (e.g., a display screen) indicating that the current call was a repeat call from a previous caller. Agent WS 148-3 may also automatically display information regarding the previous call. For example, call processing logic 620 (FIG. 6) may retrieve details associated with the previous interaction between agent Smith and the caller, such as information associated with a customer order, a billing inquiry, etc. Providing this information to the agent will allow the agent to streamline the handling of the current call.

Returning to act 760, if the user answers in the negative (i.e., does not wish to speak to the previous agent), routing logic 320 may forward the call to ACD 146 for forwarding to the next available agent (act 750). In this case, routing logic 320 may also include information when forwarding the call to ACD 146 to ensure that the call will not be forwarded to the previous agent.

Returning to act 740, in some instances, routing logic 320 determines that the previous agent is currently handling a call (act 775). In this case, routing logic 320 may determine an approximate wait time for the agent to be available (act 780). For example, routing logic 320 may identify the duration of the call that the agent is currently handling. Routing logic 320 may also determine an average handling time (AHT) for calls handled by that particular agent. The AHT for calls handled by each agent may be stored in table 500 or elsewhere in network 100. In one implementation, routing logic 320 may subtract the current call duration from the AHT for the particular agent to generate an estimated amount of time remaining for the current call being handled by the agent. The estimated time remaining on the current call will correspond to an estimated wait time for the agent to be available.

Routing logic 320 may then determine whether the estimated wait time is greater than a threshold value (act 785). If so, routing logic 320 may forward the call to ACD 146 for servicing by the next available agent (act 790). In this case, routing logic 320 will not forward the call to the agent that handled the previous call since the wait time is greater than the threshold.

If, however, the wait time is not greater than the threshold, IVR logic 340 may inquire whether the caller would like to talk to the agent he/she previously spoke with and provide an estimated wait time (act 760). For example, as described previously, IVR logic 340 may provide an audio announcement such as: "Mr. Jones, you previously spoke with agent Smith. Would you like to speak with agent Smith again? Agent Smith will be available in approximately one minute." If the user answers affirmatively (act 760—yes), routing logic 320 may return an agent ID associated with agent Smith and a time to wait value associated with when the call will be forwarded to the agent (act 765).

Routing logic 320 may forward the call to ACD 146 with instructions to queue the call as the next call for the identified agent (i.e., agent Joe Smith in this example) or queue to the call directly to the agent WS 148-3. In either case, when agent Smith becomes available, the call will be automatically forwarded to agent Smith's WS 148-3, along with information associated with the call. Agent WS 148-3 may receive the call and automatically "pop" information to agent Smith's output device 250 indicating that the current call is a repeat or follow up call from a previous caller. Call processing logic 620 (FIG. 6) may also retrieve details associated with the previous interaction between agent Smith and the caller from memory 630, such as information associated with a customer order, a billing inquiry, etc., that was handled during the previous call, and display this information via output device 250 on agent WS 148-3. Providing this information to the agent will allow the agent to streamline the handling of the current call.

If, however, the user answers in the negative (i.e., does not want to wait for the previous agent to be available; act 760—no), routing logic 320 may forward the call to ACD 146 for forwarding to the next available agent (act 750). That is, if the user does not want to speak to the previous agent, based on any number of factors including the wait time, routing logic 320 may forward the call to ACD 146 along with information to ensure that the call is not routed to the agent that handled the previous call from the caller.

In the manner described above, calls received from customers may be forwarded to an agent with whom the customer previously interacted. This may allow the agent to more easily interact with the customer since he/she was previously interacted with the customer. Although the implementations have been described above with respect to receiving telephone calls at a call center, in other implementations, other types of communications may be received at a call center or a contact center. For example, in other implementations, a contact center may receive video calls, video chats, electronic mail messages, text messages, instant messages or chats, facsimile messages, or any other type of communication. In each case, the voice portal or another network device may determine whether to forward the current communication to the agent that handled the previous communication/interaction with the customer.

Implementations described herein provide for forwarding communications to a contact center agent that has previously interacted with a customer. This may allow the contact center to handle the communication in a more efficient manner. In addition, having an agent handle a subsequent or follow-up call from a customer may improve the overall customer experience.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to voice portal 142 (or 152) forwarding calls to an ACD 146 (or 156) or agent WS 148 (or 158). In other implementations, another network device or multiple network devices may be involved in performing the tasks described above with respect to forwarding a call/communication. For example, in some implementations, an ACD may perform the decision-making described above. In still other implementations, one or more centralized network devices not located at a particular call/contact center may perform the decision-making described above for one or more call/contact centers.

In addition, features have been mainly described above with respect to determining whether a customer has previously called within a predetermined period of time. In other instances, no determination may be made regarding how long ago a customer may have previously called. That is, if a customer has called previously, a current call may be forwarded to the agent that handled the previous call/communication. Still further, in some instances, the customer may not be provided with an inquiry regarding whether he/she would like the current call to be handled by the agent that handled his/her previous call. That is, if the agent handling the previous call is available, the call will be forwarded to the agent that handled the previous call.

Still further, features have been mainly described above with respect to a particular type of call/contact center. It should be understood that call/contact centers 140 and 150 may be associated with any type of merchant or service provider that may use a call/contact center to provide services to customers.

In addition, while series of acts have been described with respect to FIGS. 7A and 7B, respectively, the order of the acts may be varied in other implementations. Moreover, non-dependent acts or signal flows may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
receiving, at a call center, a call from a caller;
determining whether the caller has previously called the call center within a predetermined period of time;
identifying, by the call center and in response to determining that the caller has previously called the call center within the predetermined period of time, an agent that handled the previous call from the caller;
determining, by the call center, whether the agent that handled the previous call:
is capable of handling the call based on a call type or a reason for the call, and is rated above a threshold value; and
forwarding the call to the agent that handled the previous call, in response to determining that the agent is capable of handling the call and is rated above the threshold value.

2. The method of claim 1, further comprising:
inquiring, in response to determining that the caller has previously called the call center within the predetermined period of time and prior to forwarding the call, whether the caller would like to have the call handled by the agent that handled the previous call; and receiving, from the caller, an affirmative indication that the caller would like to have the call handled by the agent that handled the previous call, and wherein the forwarding further comprises:

forwarding the call to the agent that handled the previous call in response to receiving the affirmative indication.

3. The method of claim 1, further comprising:

determining, prior to forwarding the call to the agent that handled the previous call, whether the agent that handled the previous call is available to service the call.

4. The method of claim 3, further comprising:

determining, when the agent that handled the previous call is currently handling another call, an estimated wait time until the call can be serviced by the agent that handled the previous call.

5. The method of claim 4, further comprising:

providing the estimated wait time to the caller prior to forwarding the call.

6. The method of claim 3, further comprising:

prompting, when the agent that handled the previous call is unavailable or currently handling another call, the caller to leave a message; and forwarding the message to an agent workstation associated with the agent that handled the previous call.

7. The method of claim 6, further comprising:

automatically initiating a call from the agent workstation to the caller when the agent that handled the previous call is available.

8. The method of claim 1, further comprising:

receiving, at a workstation associated with the agent that handled the previous call, the forwarded call; and automatically displaying, at the workstation, information associated with the previous call in response to receiving the forwarded call.

9. The method of claim 1, wherein the determining whether the agent that handled the previous call is capable of handling the call and is rated above the threshold value comprises:

accessing at least one database, prior to forwarding the call, to determine whether to forward the call to the agent that handled the previous call, wherein the at least one database stores information identifying types of calls handled by each of a plurality of agents, agent rating information associated with each of the plurality of agents and agent availability information associated with each of the plurality of agents.

10. A system, comprising:

at least one memory configured to store information associated with a plurality of agents, wherein the information comprises types of communications handled by each of the plurality of agents, agent rating information associated with each of the plurality of agents and agent availability information associated with each of the plurality of agents; and logic configured to:
  receive a communication from a party, wherein the communication is intended for a contact center,
  determine whether the party has previously communicated with the contact center,
  identify, in response to determining that the party has previously communicated with the contact center, a first agent that handled the previous communication, and
  access the at least one memory to determine whether to forward the communication to the first agent based on the types of communications handled by the first agent, the agent rating information associated with the first agent and the agent availability information associated with the first agent.

11. The system of claim 10, wherein when determining whether the party has previously communicated with the contact center, the logic is configured to:

determine whether the party has communicated with the contact center within a predetermined period of time.

12. The system of claim 10, wherein the logic is further configured to:

inquire, in response to determining that the party has previously communicated with the contact center, that the first agent is capable of handling the communication, that the agent rating for the first agent is above a threshold value and that the first agent is available, whether the party would like the first agent to handle the communication, receive, from the party, an affirmative indication that the party would like the first agent to handle the communication, and forward the communication to the first agent in response to receiving the affirmative indication.

13. The system of claim 10, wherein when determining whether to forward the communication to the first agent, the logic is further configured to:

determine, when the first agent is currently handling another call, an estimated wait time until the communication can be serviced by the first agent.

14. The system of claim 10, wherein when determining whether to forward the communication to the first agent, the logic is further configured to:

determine whether the first agent is capable of handling the communication based on a call type or a reason associated with the communication, and determine whether the first agent has an agent rating above a threshold value.

15. The system of claim 10, wherein the communication comprises at least one of a telephone call, video message, text message, electronic mail message, instant message, video chat, or facsimile.

16. The system of claim 10, wherein the logic is further configured to:

forward the communication to the first agent along with information indicating that the party has previously communicated with the contact center.

17. A method, comprising:

receiving, at a contact center, a communication from a party;

determining whether the party has previously communicated with the contact center;

identifying, in response to determining that the party has previously communicated with the contact center, a first agent that handled the previous communication; and determining whether to forward the communication to the first agent based on information identifying types of communications handled by the first agent, a rating associated with the first agent and a status identifying an availability of the first agent.

18. The system of claim 10, wherein the logic is further configured to:

prompt, when the first agent is unavailable or currently handling another communication, the party to leave a message, forward the message to a workstation associated with the first agent, and automatically initiate a communication from the workstation to the party when the first agent becomes available.

19. The method of claim 17, further comprising:

prompting, when the first agent is unavailable or currently handling another communication, the party to leave a message;

forwarding the message to a workstation associated with the first agent; and automatically initiating a communication from the workstation to the party when the first agent becomes available.

* * * * *